United States Patent Office

2,804,145
Patented Aug. 27, 1957

2,804,145

PROCESS FOR ACIDIZING INJECTION WELLS

Orrin C. Holbrook, Crystal Lake, Ill., assignor to The Pure Oil Company, Chicago, Ill., a corporation of Ohio No Drawing. Application November 30, 1954, Serial No. 472,223

9 Claims. (Cl. 166—10)

This invention is directed to stimulating the recovery of residual oil from partially depleted reservoirs. It is especially concerned with the selective acid treating of formations surrounding injection wells employed in secondary recovery operatioins.

As a well-completion or stimulation technique, the acid treatment of geological formations to reduce their resistance to the flow of fluids therethrough has become a well established procedure. Although used extensively in the treatment of producing formations to facilitate primary recovery of the fluids contained therein, it is also employed in the treatment of partially depleted fluid reservoirs wherein the indigenous fluid-expulsion forces have diminished to the extent that it is uneconomical to employ conventional primary recovery methods. The recovery of fluids from these partially depleted reservoirs is generally termed secondary recovery and effected by a variety of expedients. Perhaps the most commonly used method involves the artificial injection of a fluid from an injection well into the formation to carry along or drive ahead residual oil through the reservoir and force it into a producing well or wells. Both gas and water have been used for injection purposes. The choice of fluid depends upon a number of factors, such as lithological characteristics, availability of gas or water, manner in which the residual oil is held in the reservoir, i. e., adherent or capillary-held oil, properties of the residual oil, etc. Where a fluid is employed as the driving means in the secondary recovery operations, it is desirable that the formation have a suitable injectivity index. This index is a criterion of the capacity of a well to pass injected fluids into the reservoir rock. Quite frequently it is necessary to treat the formation surrounding an injection well with a formation penetrator, i. e., acidizing or hydraulic fracturing, to alter the existing injectivity characteristics as well as provide a uniform distribution of the water or gas being injected into the formation. Structural characteristics of geological formations vary. Accordingly, the following distinctions will be used in describing the subject invention:

A formation is any sedimentary bed or stratum sufficiently homogeneous to be regarded as a unit. Fluids such as petroleum oil, gas, and/or water may be found distributed throughout the formation or only in intervals or zones of the formation. Although a formation may be substantially homogeneous in composition, formations do occur which vary transversely in permeability. Where the variations in formations are relatively thin they are referred to as streaks. There are frequently encountered intervals or zones in the formation with alternating or successive streaks of varying permeability wherein different ratios of more permeable streaks to less permeable streaks are encountered. As a general rule it would be perferred if the formation penetrator was introduced into those streaks having a permeability of less than about 75 millidarcies. The selective directing of the fluid treating agent into the less permeable streaks is advantageous because maximum enhancement of the flow characteristics of a formation can be obtained with a minimum amount of treating fluid.

It is therefore an object of this invention to selectively treat the less permeable streaks of a partially depleted, fluid-bearing formation surrounding an injection well used in the water-flooding of said formation with a formation penetrator such as acidizing or hydraulic fracturing. This and other objects will be made more apparent by the following detailed description of this invention.

In increasing the efficiency of oil and gas production from formations having a non-uniform permeability by selective acidizing techniques, a number of expedients are available, including the so-called "two-pump method," jet-acidizing with jet acid-guns, used of packers, and temporary bridge plugs which shut off subjacent zones where acid treatment is not wanted. In addition, temporary sealing or plugging agents have also been employed. In general, these techniques permit the acid or other chemical treatment of an entire zone or interval selected because of its ratio of high permeability streaks to low permeability streaks. In this manner the by-passing of the acid into more permeable adjacent zones is at least minimized. However, within the zones or intervals which are isolated there may also be streaks of low permeability which should be treated in order to increase their permeability. This, however, is not possible using conventional isolation methods noted above wherein an entire zone or interval of a producing formation is sealed. Because of the presence of alternating high permeability and low permeability streaks, it is desirable to isolate only the more permeable streaks occurring within a producing zone in order that more extensive intervals can be acidized with minimum amounts of treating reagents. According to this invention, this desideratum may be effected by taking advantage of a pressure phenomenon known as transient back-pressure. This phenomenon manifests itself when the pressure employed in the injection of water into a partially depleted reservoir during secondary recovery operations is suddenly reduced. The pressure in the more permeable part of the formation near the well bore diminishes to formation pressure quite rapidly. However, the pressure in the less permeable parts of the formation is retained and decreases much more slowly. A low permeability streak can keep a back-pressure for several days, while the back-pressure in the more permeable streaks decreases to formation pressure in a short period of time. In carrying out the instant invention, the isolation of the less permeable streaks from the more permeable streaks to facilitate the selective acidization of the latter sections of the formation may be accomplished by employing the back-pressure in the less premeable parts of the formation to prevent the inimical penetration of sealant into the said less permeable streaks. Accordingly, if the sealant is injected between the time when the injection pressure is first reduced and the time when the transient back-pressure existing in the less permeable streaks decreases to the pressure existing in the well bore, the sealant will preferentially be forced into the more permeable parts of the formation. For example, during the course of injecting the drive-fluid, e. g., water, into the formation, a suitable amount of a temporary sealing or plugging agent is introduced into the fluid stream at normal injection pressure. The sealant employed in the instant invention is a reversible gel which is introduced into the formation in the sol phase and then gelates. When the sealing agent has been positioned adjacent the formation interval to be treated, as determined by volumetric displacement measurements or the like, the injection pressure is substantially reduced, and the formation interval being treated is contacted with the sealant at a pressure substantially lower than normal injection pressure. Because of the transient back-pressure existing in the less permeable streaks, the temporary sealant will enter the more permeable streaks and solidify therein. The acid or other substance, such as fracturing fluid, used in treating the less permeable streaks is then injected into the less permeable streaks, which were not sealed at a pressure between normal injection pressure and the reduced pressure at which the liquefied sealing agent was injected, in order to decrease the resistance of said streaks to the flow of fluids therethrough. The temporary sealing agent is then removed from the formation interstices in which it was disposed and, if necessary, the acid is back-flowed. Thereafter, the water injection is resumed.

The following non-limiting example shows in greater detail the practice of this invention:

A water injection well penetrating a calcareous formation which has several loose streaks, as determined by core analysis data, has a normal injection pressure of 500 p. s. i. at a rate of 110 barrels of water/day. The producing formation, which is susceptible to a hydrochloric acid treatment, is about 22 feet thick and at a formation depth of 1552 feet has a temperature of about 85° F. While maintaining the normal injection pressure and rate, after equilibrium flooding conditions have attained, about 50 gallons of temporary sealant, consisting of a 2½ weight percent solution of gum karaya in a 15% by weight solution of hydrochloric acid, is injected into the flooding water. Pumping of the resulting mixture is continued until the lower interface between the sealant and the flooding water is positioned at the top of the 22 foot section which is to be treated. The injection pressure at the well head is then reduced to 250 p. s. i. and the pumping continued until the temporary sealant has been forced into the several loose streaks. The water flood is shut off after the sealant has been flushed from the well bore into the formation and about 1000 gallons of 15% by weight hydrochloric acid is pumped into the unsealed streaks in the formation at a well head injection pressure of about 300 p. s. i. The injection of the flooding water is continued after the acidizing phase has been completed. Initially the flood water will be diverted through the streaks which have been acidized. However, after about 15-30 hours the temporary sealant disposed within the several loose streaks will become peptized, permitting the liquefied sealant to be flushed from within the interstices of the loose streaks. The flood water will then partially flow through these streaks, thereby effecting an improvement in the distribution rate of the flooding agent. The selective acidizing of the less permeable streaks occurring in a producing interval of a partially depleted reservoir has been illustrated by the foregoing example. However, the subject invention is not limited by the materials, conditions or techniques employed.

A variety of sealing agents may be utilized in carrying out the instant invention. The sealant employed is of a reversible gel which preferentially reverts to the liquid state after functioning as a solid sealant without requiring that the sealing agent be contacted by additional peptizers.

Suitable materials having these characteristics are reversible type gels, which may be prepared by a number of methods. It is preferred that the peptizing of the gel whico is used as the temporary sealant be self-executing. Bodied substances of this nature may be prepared by thickening a solvent such as various strong inorganic acids, e. g., hydrochloric, sulfuric, etc., or organic solvents, e. g., light petroleum distillates, low molecular weight chlorinated hydrocarbons, aromatic hydrocarbons, etc., with a water soluble gum such as gum garaya, tragacanth, galbanum, etc. About 1-10 parts of gum per 99-90 parts of solvent will provide a suitably thickened substance which may be employed as a temporary sealant. Gels prepared employing acidic solvents will peptize without further treatment. Further details on the characteristics of gum-containing temporary sealants are found in U. S. Patent 2,596,137.

Other types of gelling agents may also be used to pa pare the reversible gels employed in this invention a include the aluminum soaps derived from long chain fa acids such as the so-called napalm soaps which are m tures of aluminum laurate and aluminum soaps of cyc paraffinic and unsaturated acids. The introduction sufficient amounts, preferably 1-10 parts per 99-90 pa of a suitable solvent, will provide a gel which will rev to the fluid stage upon being contacted with a peptiz such as water, ammonia or substituted ammonia co pounds, strong acids, and others. These peptizers m be incorporated in the gelled sealant so that the viscosi of the sealing agent will be substantially reduced aft a time delay sufficient to permit treatment of the strea within the formation which remain unsealed during tl carrying out of this invention. Suitable solvents inclu light petroleum distillates, animal and vegetable oils, ar matic hydrocarbons, etc. More complete detail on tl characteristics of this type of temporary sealant is foun in U. S. Patent 2,596,844.

In the event that reversion to the low viscosity flui state is not effected by the use of suitable peptizing ma terials, gelling agents such as high molecular weight soap disposed in a suitable solvent may be employed as sea ing agents. These gels are heat reversible. After thes sealants have functioned in their intended capacity th more permeable streaks containing such sealants may b opened by the application of heat from a suitable sourc It is evident that the foregoing discussion of severa types of substances which may be used in carrying ou the instant invention is only illustrative. Other reversibl gels which may be readily reverted to the less viscous stat will be obvious to those skilled in this art and as such ar considered within the scope of this invention.

In carrying out the isolation of the less permeabl streaks within a producing interval, a conventional in jection system may be employed with slight modifica tions of the well head to permit the introduction of th liquefied sealing agent as well as the acidizing mediun which is to be employed. The injection wells employec in water-drive operations must be suitably equipped be fore the drive-fluid is introduced. A number of arrange ments of tubing and packers have been described in the prior art for permitting the injection of the drive-fluid. In general, however, the well is equipped so that the injection of the drive-fluid is confined to the formation or formations being treated. This also facilitates the injection of the sealing agent and acidizing material.

The subject invention is applicable to the treatment of calcareous, dolomitic, or siliceous formations with formation penetrators to effect an increase in the permeability. In the event that an acidizing agent is employed as the formation penetrator, the type of formation will determine the type of treating reagent which is to be employed. In the case of calcareous or dolomitic formations, hydrochloric acid solutions are preferably employed, although other mineral acids, such as sulfuric, nitric, etc., may be utilized. In the treatment of siliceous formations, any reagent capable of reacting with the siliceous constituents of the formation to improve the drainage characteristics thereof is to be employed. Aqueous solutions of fluophosphoric acids are preferred. Other hydrogen fluoride-containing or hydrogen fluoride-producing reagents may also be utilized. As in conventional acidizing practices, the amount of acid employed will depend upon the formation extent, permeability characteristics, and other lithological considerations. The acidization of the formation subsequent to the isolation of the less permeable streaks from the more permeable streaks is carried out employing conventional acidizing techniques. However, it is preferred to employ a system wherein the modification of the fluid injection system is held to a minimum to avoid unnecessary expense arising from piping changes.

Even though it has been pointed out that acidic substances such as the acid type formation penetrators hereinabove-described function as peptizing agents, the acidizing phase of this invention may be carried out effectively without unsealing the more permeable streaks containing the temporary sealants of this invention. The rate of diffusion of acid through the sealant is negligible and any peptizing of the sealant will be local and occur at the exposed face. Accordingly, the peptizing of the sealant with the acidizing agent will be slow enough to permit the concomitant acid treatment of the unsealed less permeable streaks.

It is also within the scope of this invention to employ hydraulic fracturing techniques in the treatment of the less permeable streaks to increase their permeability. Where fracturing fluids are employed as the formation penetrator, conventional hydraulic fracturing techniques are employed. Processes wherein a fracture is produced in a formation by applying sufficient hydraulic pressure by means of a low viscosity pressure transmitting medium are comprehensively discussed in the prior art. For examples of suitable processes see U. S. Patents, Re. 23,733, 2,596,843, 2,596,844, 2,596,845, 2,664,954, 2,667,224, 2,667,457, and others.

Accordingly, the use of acidizing techniques and hydraulic fracturing processes in that phase of this invention directed to increasing the permeability of the unsealed, less permeable streaks will be referred in the appended claims as the use of formation penetrators.

During the injection of the gas or water into the formation, it may be desirable, just prior to carrying out the selective acidization process of this invention, to increase the injection pressure in excess of that normally employed in order that a greater transient back-pressure may be developed in the less permeable streaks of the formation. Prior to carrying out the selective acidization, it is desirable that complete and accurate information concerning the lithological and stratigraphic properties of the producing formation interval be obtained. However, one of the advantages of the instant invention is that a minimum amount of preliminary investigation of the formation to be treated is necessary. Conventional well-logging equipment such as that employed for measuring the spontaneous potential of formations may be used for logging permeability variations. Although the time element can be ascertained experimentally in a laboratory by means of bench scale equipment, a more practical approach utilizes correlation of pressure-decline at the wellhead with time. This indicates the relative amount of streaks of varying permeability because the higher the proportion of streaks of low permeability the slower the pressure decline will be. For example, in studies of formation streaks having a wide variation in permeability, a formation having a permeability of 6 millidarcies will have an intake rate of 0.85 barrel of water/day/foot at a well head injection pressure of about 600 p. s. i. If the well head pressure is reduced to about 300 p. s. i. the intake rate is reduced to 0 for about one hour, slowly increasing thereafter until equilibrium flow conditions occur after about 24 hours. On the other hand, a formation having a permeability of 50 millidarcies would have an intake rate of 6.0 barrels of water/day/foot at the initial injection well head pressure of about 600 p. s. i. However, when the injection pressure is reduced to 300 p. s. i., the flow conditions, although affected, return to equilibrium in less than one hour (Vide Secondary Recovery of Oil in the United States, 2nd ed., American Petroleum Institute, 1950).

The time required for the transient back-pressure of a particular streak to decrease to normal formation pressure can be determined, and in this manner the timing of the sealing and acidizing phases of the selective acid treatment may be established. The exact time, however during which the sealing agent will preferentially enter the more permeable streaks will depend upon initial injection pressure, permeability, viscosity of the liquefied sealing agent, as well as a number of other conditions which must be taken into consideration before the selective acidization is employed.

It is preferred in carrying out the instant invention that the reduction in pressure, necessary to effect a sufficient transient back-pressure in the less permeable streaks and prevent an ingress of inimical amounts of sealant therein, be about one-half of the normal injection pressure. It is obvious, however, that the normal injection pressure be reduced sufficiently to produce not only the necessary transient back-pressure but also to provide enough pressure to force the temporary sealant into the more permeable streaks which do not manifest any appreciable back-pressure. Once the sealant has been disposed in the interstitial passages of the more permeable streaks, any desired pressure can be employed in the subsequent step of injecting the formation penetrant into the less permeable streaks to effect an increase in the permeability thereof. In selecting the normal injection pressure care must be exercised to avoid pressure-parting of the formation being treated. In general, a pressure about 0.5 to 1.5 p. s. i./foot of well depth of pressure is applied. For example, in the Bradford field in northern Pennsylvania where oil is produced from formations 1100–2100 feet below the surface well, head-pressures of as high as 1600 p. s. i. have been employed. In the Bartlesville sand areas of northern Oklahoma, well head pressures of about 600 p. s. i. are employed in water flood sands encountered at a depth of about 1200 feet.

Although the foregoing discussion was limited to the application of the instant invention to the selective acidization of partially depleted fluid-bearing reservoirs which are being drained by secondary recovery methods, it is also possible to employ the instant invention in the selective acidization of formations which are being exploited by primary recovery methods. Thus oil, gas, or water-bearing formations may be treated in this manner. In these instances it is only necessary to equip the well bore for the injection of a liquid into the formation. The transient back-pressure can be produced therein in the same manner as described above. While water may be employed, in order to avoid emulsification and separation problems, it is preferred that the lease oil, i. e., crude oil, petroleum, distillate oils such as kerosene, gas oil, etc., or some other fluid compatible with the crude oil being produced from the reservoir be employed. In addition, other types of injection liquids may be used and their selection will depend upon the needs and judgment of those skilled in this art. The acidization phase of the invention can be carried out in the manner described above.

I claim:

1. In the treatment of geological fluid-bearing formations having intrazone permeability differentials resulting from the occurrence within said formation of adjacent streaks of varying permeability, a method for selectively acidizing the less permeable streaks of said formation traversed by an injection well which comprises injecting a liquid into said formation at a pressure substantially in excess of normal formation pressure, reducing said pressure substantially below ambient formation pressure whereby a transient back-presure is produced in said formation by the backflow of the injected fluid into said injection well, injecting into said injection well a temporary sealing agent after the transient back-pressure in the more permeable streaks has dissipated to a pressure sufficient to permit the introduction of said sealing agent into said more permeable streaks whereby the transient back-pressure remaining in said formation is sufficient to prevent the inimical penetration of said sealing agent into the less permeable streaks, maintaining the sealing agent within the streaks penetrated thereby for a time sufficient to effect the solidification of the sealing agent, and thereafter forcing into the unsealed streaks an acidic formation penetrator capable of reacting with the constituents of said formation in an amount sufficient to increase the permeability of said unsealed, less permeable streaks.

2. A method in accordance with claim 1 in which the liquid injected into said formation to induce said transient back-pressure is a petroleum oil.

3. A method in accordance with claim 1 in which the liquid injected into said formation to induce said transient back-pressure is water.

4. In the treatment of geological fluid-bearing formations having intrazone permeability differentials resulting from the occurrence within said formation of adjacent streaks of varying permeability, said formation being exploited by secondary recovery means employing fluid injection, a method for selectively acid treating the less permeable streaks of said reservoir which comprises injecting into said formation, which is traversed by an injection well, a liquid at a pressure sufficient to force said liquid into the interstitial passages of said formation, reducing said pressure below the ambient formation pressure whereby a transient back-pressure is produced in said formation by the backflow into said injection well of the injected liquid, injecting into said injection well a temporary sealing agent after the transient back-pressure in the more permeable streaks has dissipated to a pressure sufficient to permit the introduction of the sealing agent into said more permeable streaks whereby the transient back-pressure remaining in said formation is sufficient to prevent the inimical penetration of said sealing agent into the less permeable streaks, maintaining the sealing agent within the more permeable streaks penetrated thereby for a time sufficient to effect the solidification of said sealing agent, and thereafter forcing into the unsealed streaks an acidic formation penetrator capable of reacting with the constituents of said formation in amount sufficient to increase the permeability of said unsealed, less permeable streaks.

5. A method in accordance with claim 4 in which the temporary sealing agent is a reversible gel capable of being peptized to substantially reduce its viscosity.

6. A method in accordance with claim 5 in which said reversible gel is an acidic solution of a water-soluble gum in a strong mineral acid.

7. In the treatment of geological fluid-bearing formations having intrazone permeability differentials resulting from the occurrence within said reservoir of adjacent streaks of varying permeability, said reservoir being exploited by secondary recovery means employing fluid injection, a method for selectively acid treating the less permeable streaks of said reservoir which comprises injecting into said formation a liquid at a pressure sufficient to force said liquid into the interstitial passages of said formation, reducing said pressure substantially below ambient formation pressure whereby a transient back-pressure is produced in said formation by the outflow therefrom of the injected liquid, injecting into said injection well a temporary sealing agent after the transient back-pressure in the more permeable streaks has dissipated to a pressure sufficient to permit the introduction of the sealing agent into said more permeable streaks whereby the transient back-pressure remaining in said formation is sufficient to prevent the inimical penetration of said sealing agent into the less permeable streaks, maintaining the sealing agent within the more permeable streaks penetrated thereby for a time sufficient to effect the solidification of said sealing agent, introducing into the unsealed, less permeable streaks an acidic formation penetrator capable of reacting with the constituents of said formation in an amount sufficient to increase the permeability of said less permeable streaks and at a pressure intermediate between the said injection pressure and the said reduced pressure at which the temporary sealing agent was injected into the formation, removing the temporary sealing agent from the more permeable streaks, and thereafter introducing into said reservoir additional amounts of injection fluid at a pressure and in amount sufficient to induce drainage of the residual oil in said reservoir.

8. A method in accordance with claim 7 in which said liquid is injected into said formation at a pressure of about 0.5–1.5 p. s. i./foot of well depth and the injection of said temporary sealing agent into said formation is effected at about ½ the pressure at which said fluid is introduced into said formation.

9. In the treatment of geological fluid-bearing formations having intrazone permeability differentials resulting from the occurrence within said reservoir of adjacent streaks of varying permeability, said reservoir being exploited by secondary recovery means employing fluid injection, a method for selectively acid treating the less permeable streaks of said reservoir which comprises injecting into said reservoir water at a pressure between about 0.5 to 1.5 p. s. i./foot of well depth to induce the drainage of said reservoir, reducing said pressure to about ½ of said injection pressure, contacting said formation with an acidic solution of gum karaya in hydrochloric acid, forcing said acidic solution at said reduced pressure into the more permeable streaks whereby said more permeable streaks are temporarily sealed, forcing an acidizing medium into the unsealed streaks at a pressure intermediate the said injection pressure and said reduced pressure and in an amount sufficent to increase the permeability of said reduced streaks, removing said sealing agent from said more permeable streaks and thereafter introducing additional amounts of said water to induce further drainage of the residual oil in said reservoir.

References Cited in the file of this patent
UNITED STATES PATENTS

| | | |
|---|---|---|
| 2,223,804 | Kennedy | Dec. 3, 1940 |
| 2,402,588 | Andresen | June 25, 1946 |
| 2,546,252 | Bankson | Mar. 27, 1951 |